US009110627B2

(12) United States Patent
Singhal

(10) Patent No.: US 9,110,627 B2
(45) Date of Patent: Aug. 18, 2015

(54) SYSTEMS AND METHODS FOR VIEWING LARGER THAN SCREEN SIZE DIGITAL CONTENT ON DISPLAY SCREENS WITHOUT ZOOMING AND SCROLLING

(76) Inventor: Tara Chand Singhal, Torrance, CA (US)

( * ) Notice: Subject to any disclaimer, the term of this patent is extended or adjusted under 35 U.S.C. 154(b) by 940 days.

(21) Appl. No.: 12/928,471

(22) Filed: Dec. 13, 2010

(65) Prior Publication Data

US 2012/0147033 A1   Jun. 14, 2012

(51) Int. Cl.
  *G09G 5/00*  (2006.01)
  *G06F 3/147*  (2006.01)
  *G06F 3/0482*  (2013.01)
  *G06F 3/0483*  (2013.01)

(52) U.S. Cl.
  CPC .............. *G06F 3/147* (2013.01); *G06F 3/0482* (2013.01); *G06F 3/0483* (2013.01); *G06F 2203/04804* (2013.01); *G09G 2340/145* (2013.01); *G09G 2370/022* (2013.01); *G09G 2370/027* (2013.01); *G09G 2370/04* (2013.01)

(58) Field of Classification Search
  None
  See application file for complete search history.

(56) References Cited

U.S. PATENT DOCUMENTS

| | | | |
|---|---|---|---|
| 6,121,966 A * | 9/2000 | Teodosio et al. | 715/838 |
| 6,684,087 B1 * | 1/2004 | Yu et al. | 455/566 |
| 2002/0112237 A1 * | 8/2002 | Kelts | 725/39 |
| 2003/0189597 A1 * | 10/2003 | Anderson et al. | 345/778 |
| 2004/0103371 A1 * | 5/2004 | Chen et al. | 715/513 |
| 2006/0123183 A1 * | 6/2006 | Koivisto et al. | 711/1 |
| 2007/0083810 A1 * | 4/2007 | Scott et al. | 715/525 |
| 2008/0259057 A1 * | 10/2008 | Brons | 345/184 |
| 2009/0128483 A1 * | 5/2009 | Robbins et al. | 345/156 |
| 2010/0123737 A1 * | 5/2010 | Williamson et al. | 345/672 |

* cited by examiner

*Primary Examiner* — James A Thompson
(74) *Attorney, Agent, or Firm* — Steve Roeder, Esq.

(57) ABSTRACT

A system for displaying information on a display screen of a computing device, where the digital content is of the size that exceeds the display screen size for display has a display logic that parses the digital content into multiple screen views, each screen view is sized for the screen and an orientation, and stores these multiple screen views in the memory. The display logic selects and displays a single screen view of the multiple screen views on the screen overlaid with a transparent miniature view map of the multiple screen views with the view map highlighting the specific screen view being displayed. Touch-selecting a specific screen view from the view map brings up that view for display from the storage memory, with an updated view map, enabling a user to simultaneously see a view of the digital content and the size of the content.

14 Claims, 11 Drawing Sheets

At step 60, receiving and storing digital content in a storage memory of a computing device with a CPU, that has a display screen for displaying information from the storage memory;

At step 62, receiving parameters of, digital content file id, digital content size, device screen size, font size, and screen orientations by a display logic and parsing the content into multiple screen views, each view is sized for the screen and the orientation, and storing these multiple display views in a part of the storage memory;

At step 64, selecting and displaying a single display view of the multiple views on the screen by the display logic overlaid with a transparent miniature view map of the display views with the map highlighting the specific view being displayed;

At step 66, touch selecting a view from the view map for bringing up that specific view for display, with an updated view map, enabling a user to simultaneously be exposed to and see a view of the digital content, know the size of the digital content and select any view for display, without having to zoom or scroll the content.

At step 68, sorting by the logic first the digital content into one or more standard format pages from a group of pages of, an html page, a text page, a PDF image, an image page and then parsing each standard page into multiple views based on the page type and the screen size.

At step 70, programming the display logic to select the first view of the digital content that provides a representation of the content, including from a group of, a title, a first sentence, a first paragraph, a header block, and a first image.

At step 72, displaying a sequence indicator in the view map, for multiple pages, if more than one standard page is required for display of the content, enabling the user to know the number of pages and accessing the view map of another page.

At step 74, parsing by the display logic, each page into multiple views based on information arranged in columns and headlines on the page, enabling the user to view information as it was formatted on the page.

Figure 6A

| At step 80, embedding a device_type parameter in the protocol between the device and a web server for requesting content from the server. |
|---|
| At step 82, formatting content for the device_type in the web server before sending the content to the device. |
| At step 84, passing the parameters as part of http protocol from the device to the web server. |
| At step 86, alternatively, requesting by the web-server a device_type parameter before sending content to the device formatted for the device. |
| At step 88, maintaining a table in the web server mapping device_type into the screen size, for use in formatting content before sending content to the device. |

Figure 6B

SYSTEMS AND METHODS FOR VIEWING LARGER THAN SCREEN SIZE DIGITAL CONTENT ON DISPLAY SCREENS WITHOUT ZOOMING AND SCROLLING

CROSS REFERENCE

None

FIELD OF THE INVENTION

Systems and methods for displaying digital content information on a display screen of a computing device, where the digital content is of the size that exceeds the display screen size for display, without the need to zoom and scroll the digital content, are described.

BACKGROUND

Portable wireless devices such as smart phones have small screen sizes relative to personal computers. They also have the ability to connect to the internet to receive digital content from the web servers. However the digital content in the servers is formatted to be displayed on the larger screen size of personal computers. Therefore, digital information that is received from a web server on the global network for display on a screen of these devices does not fit their limited screen sizes.

The industry solutions have been to provide zooming in on the content at selected places and then using vertical and horizontal scrolling to scroll information up/down and sideways on the device to be able to read the digital content on these small screen sizes. For example, for smaller screen sizes, as in smart phones such as the I-phone, in addition to scrolling, the solution has also been to include zooming in on the information.

Some servers store pages that are designed for small screens for the smart phones. Such servers are few and also the server does not know in advance the screen size of the receiving device. Screens of hand held devices are getting smaller and a variety of screen sizes are available.

Further, information is stored in remote servers on the Internet and the server does not know the size of the screen of the device accessing the Information. The web server sending interface does not query the size of the screen of the device receiving the content and does not format the information for the screen size. And furthermore, the device does not send the size of the screen in advance to the server.

Therefore some servers, identified by domain names, are set up to respond to smart phones only and have provided miniature pages for them. However the size of the screen is likely to vary quite a bit with the advent of new smart phones from different manufacturers.

Hence new ways to display digital content significantly exceeding the size of the screen is required without the server knowing the screen size of the content-requesting-device and reformatting the content for each device.

Hence it is the objective of the embodiments herein to be able to format digital content for display on small screen sizes where the content exceeds the size of the screen. It is further the objective to provide for an improved navigation of the digital content on the small screen sizes.

SUMMARY

A system for displaying information on a display screen of a computing device, where the digital content is of the size that exceeds the display screen size for display is described. The system has a computing device that has a CPU, an operating system, a storage memory for receiving and storing digital content, and a display screen for displaying information from the storage memory. There are two embodiments that are described.

In the first embodiment, a display logic in the CPU, receives parameters of digital content file id, content size, screen size, font size, orientation and using them parses the content into multiple screen views, where each screen view is sized for the screen and the screen orientation, and stores these multiple screen views in the memory of the device.

The display logic selects and displays a single screen view of the multiple views on the screen overlaid with a transparent view map of the multiple screen views with the view map highlighting the specific view being displayed. The transparent view map allows a user to see/read the content being displayed on the screen and at the same time the view map is visible enough to see the view map to know the size of the content in the form of multiple views of the content and which view of these many views is currently being displayed.

Touch-selecting a specific view from the view map brings up that view for display from the storage memory with an updated view map, enabling a user to simultaneously see a specific screen view of the digital content, know the size of the digital content, and select any screen view for display, without having to zoom and scroll the content.

The display logic in the device formats the digital content to the screen as multiple views of a page of information. If there are multiple pages each with its own set of screen views, the display logic adds a navigation means as part of the view map to navigate to the different pages and then navigate to different views in that page.

In the second embodiment, a protocol is created and used where, a device, when it connects to a web server, in the interface request protocol, embeds a parameter for the screen_ size and or the device_type. The parameter enables the web server to know the device_type and or the screen_size and accordingly formats the response for display on the device screen. Alternatively, also another protocol may be used where the web server may send a query for the device_ type to the device, for the device to then respond with the device_ type.

These features, it is believed, eliminate the need for the user to use scroll bars and zoom the view and thus provides a more user friendly and efficient viewing of such documents on the limited size screens of the handheld devices.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 6A-6B are method diagrams that illustrates features of the present embodiments of the invention.

DESCRIPTION

Figure 1:
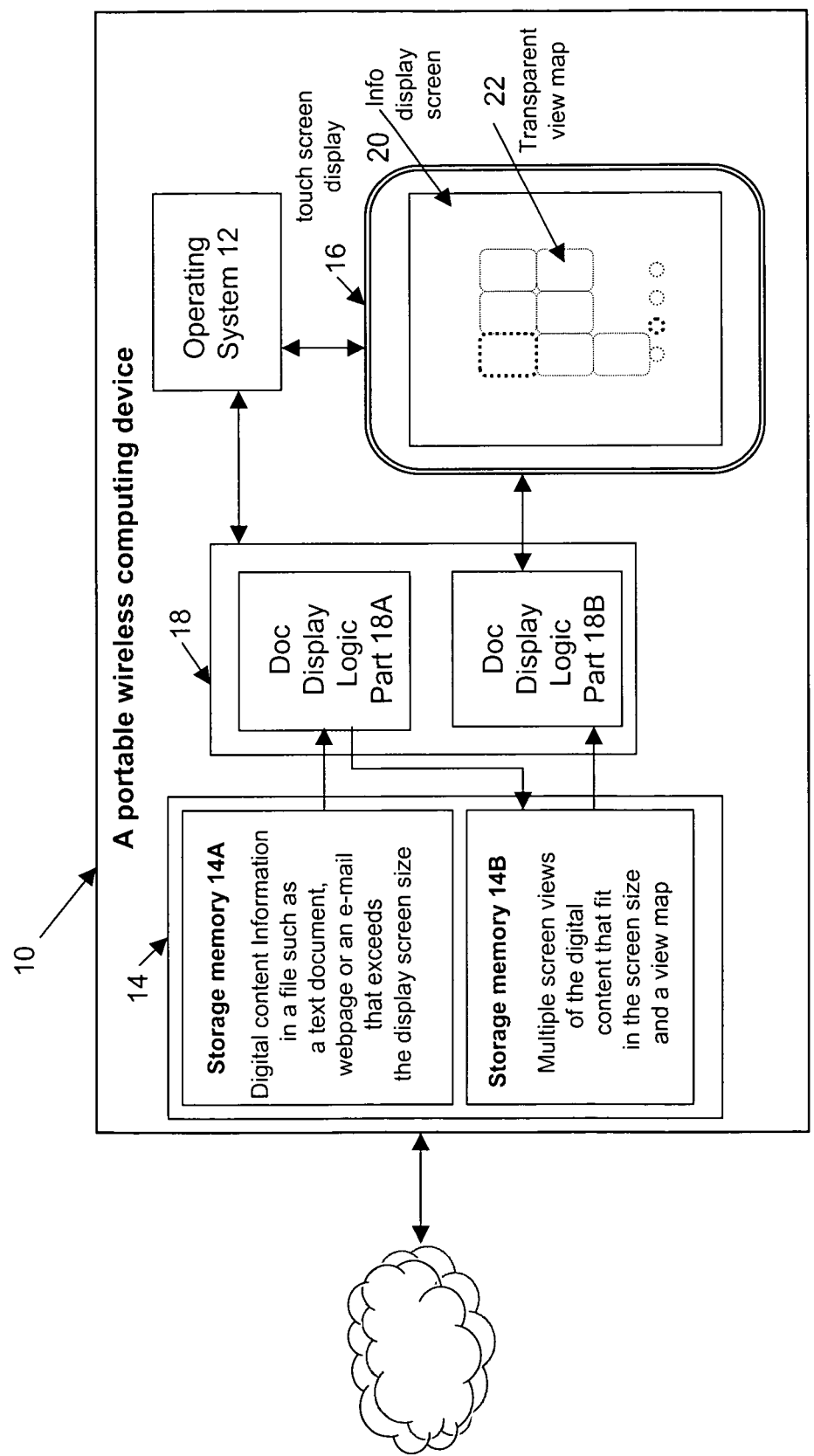
FIG. 1 is a block diagram that illustrates features of the present embodiments of the invention of viewing digital content larger than the screen size on a portable wireless device.

Introduction:

With reference to FIG. 1, in a preferred embodiment, a portable wireless computing device 10 such as a smart phone, a laptop computer, or a tablet computer has an operating system 12, a storage memory 14 and a touch screen display 16.

Therein, in the computing device 10 is a display logic 18, with a doc display logic part 18A that reads a file of digital information such as a webpage, a text page or an e-mail format from storage memory 14A and parses that file content into multiple screen views, where each view is sized for the screen size, and saves these multiple screen views in storage memory 14B. The logic part 18A also creates a view map 22 and stores that also in the storage memory 14B.

The operating system 12 enables selection of one of the documents from the storage memory for viewing. When a document is selected from storage memory 14A, a view of that document along with the view map is fetched from storage memory 14B and displayed on the touch screen 16 in the information window 20 overlaid with a transparent view map 22, enabling both the view map 22 and the digital content in screen 20 to be seen simultaneously.

The view map 22 displays the views of the document enabling the user to touch a particular screen view for display, where that view is highlighted in the view map enabling the viewer to know what part of the document is being viewed and to bring up any view without the need to zoom and or scroll the digital content.

In the second embodiment (not illustrated), a protocol is created and used where the device 10 when it connects to a web server, in the request interface protocol, embeds a parameter for the screen size and or the device type. The parameter enables the web server to know the device type and or the screen size and accordingly formats the response for display on the device screen. The parameter that is passed from the device to the web server may include a screen size such as 2×3, 4×5, 5×7, 7×9 etc. Alternatively, the parameters may include a device type and device model, enabling the server to maintain a lookup table of the screen sizes of such devices. Alternatively, also the protocol may be used where the web server may send a query for the device_type to the device, for the device to then respond with the device-type value. The hypertext transfer protocol (http) used for the interface between a web server and a device provides for passing such parameters. There are two main types of such http protocols called GET and POST.

In the second embodiment, a part of the display logic 18 would be performed in the web server. As a simplified illustration, the display logic 18A may be performed in the web server and display logic 18B would be performed in the device itself.

Further details of these features are provided with the help of following headings.

View Map 22

Figure 2A:
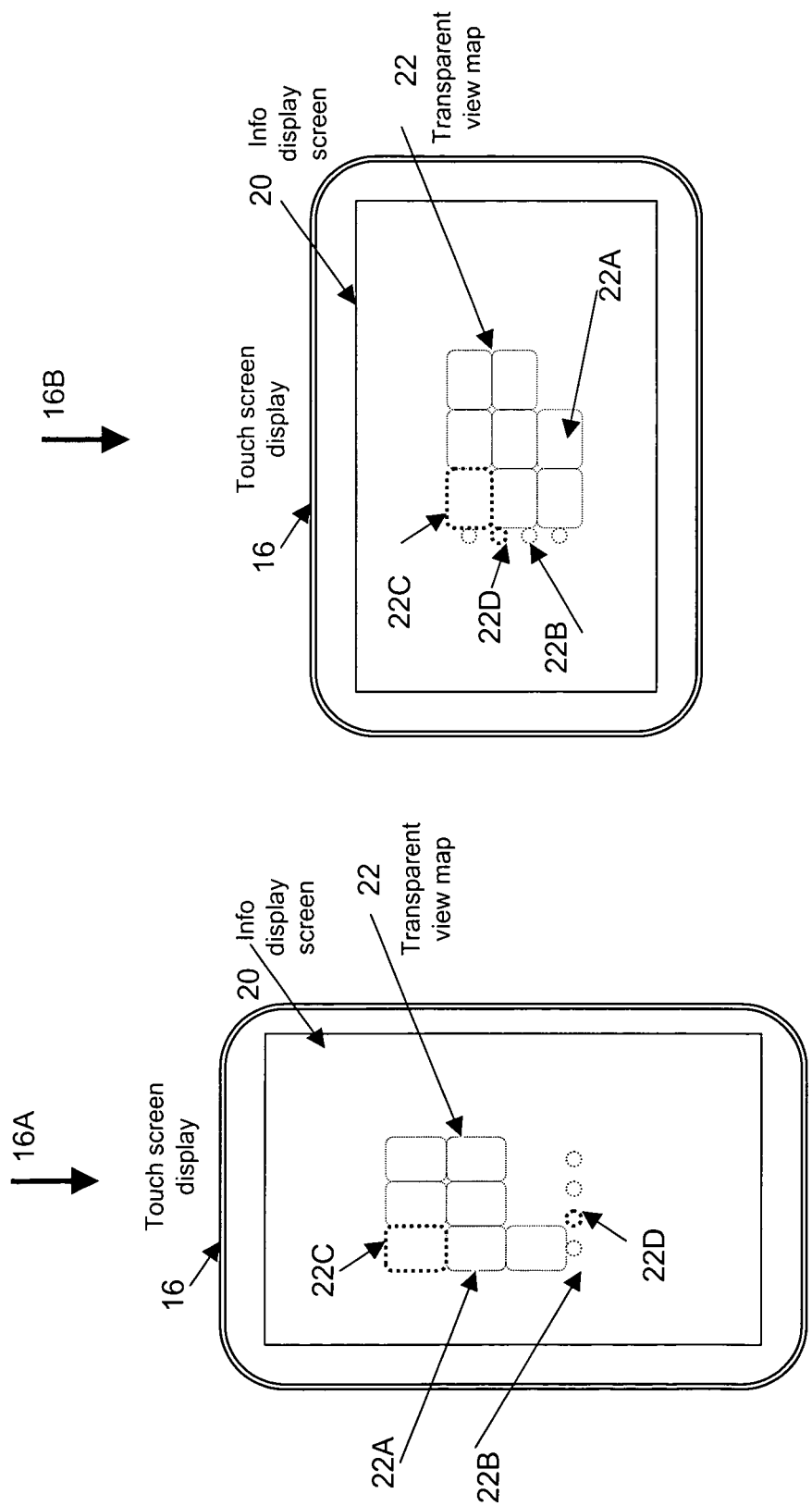
FIG. 2A-2B are block diagrams that illustrates features of the present embodiment of the invention for viewing different orientations of the screen size for smaller screens.

FIG. 2A shows touch screen 16 in the portrait orientation 16A and landscape orientation 16B, along with their view maps 22. The view map 22 may have two parts, a view of the screen views 22A from a page and the number of such pages 22B, if there is more than one page. A particular page 22D and a particular view 22C in that page that is displayed in the information window 20 is highlighted.

Figure 2B:
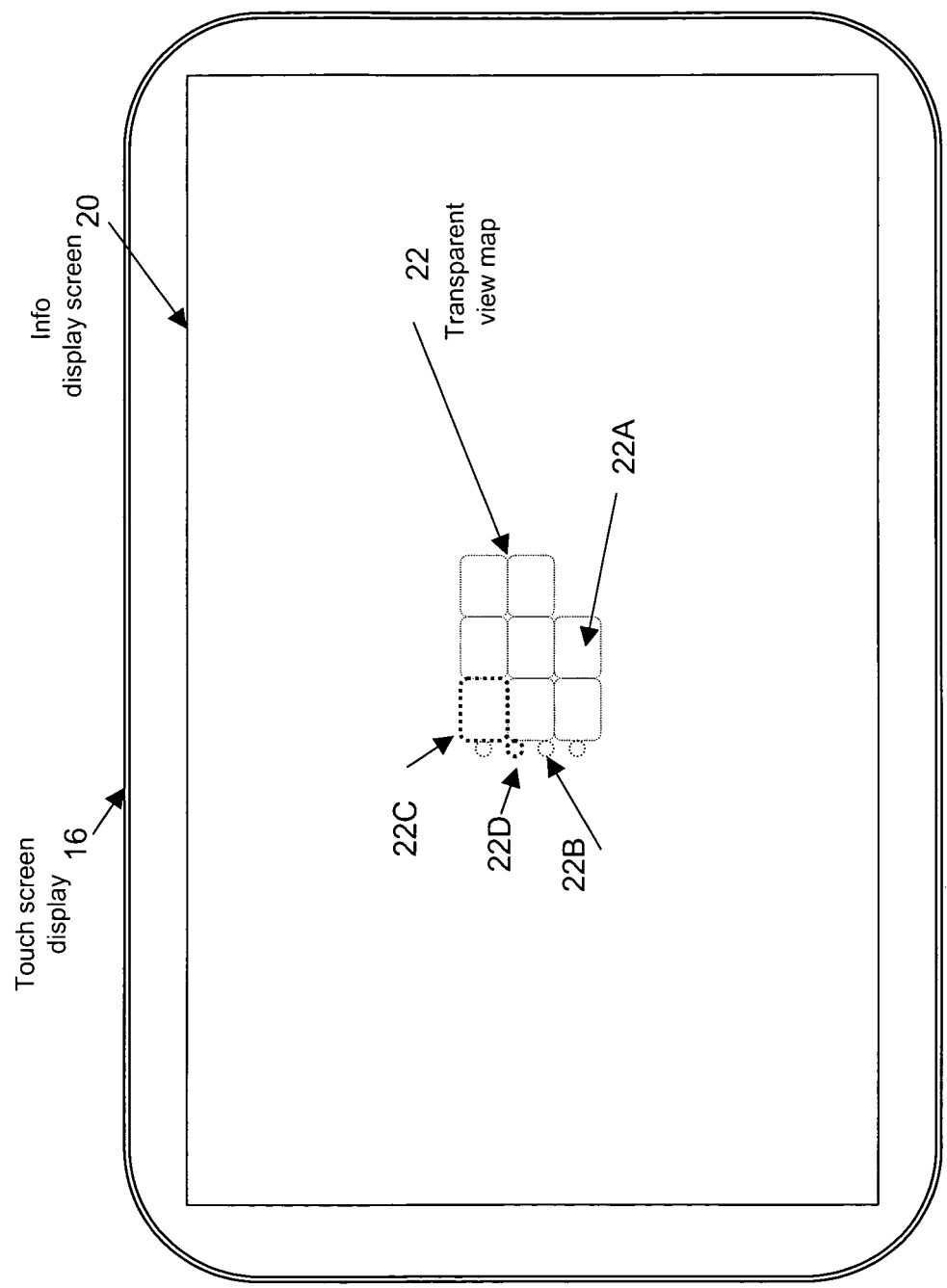

The highlighting may be accomplished in any number of ways; however a highlight that may bold the lines of the box may be preferred due to maintaining the transparency of the view map 22 to the user, while viewing the content in the information window 20. FIG. 2B shows the use of the view map 22 for a larger screen such as that used in the I-pad style tablet computer. The view map 22 is preferably placed in the center of the screen.

Details of the view map 22 features are described below with reference to FIGS. 2A and 2B. The view map 22 has a representation of number of the screen views 22A present in each page and number of pages 22B in a document. The screen views are shown as boxes and the page views are shown as circles. Other nomenclatures may also be used and are not ruled out.

These boxes and circles are preferably line drawings of empty figures and the lines are transparent of light shading, or they may be dotted lines, so that when a view map 22 is shown on top of the screen view, a user is exposed to the screen view and its contents and the view map without they being a distraction to each other. The view map 22 may be shown as a graphics layer on the screen, where the layer may be placed either in the background or the foreground of the digital content layer on the screen. These boxes and circles are of the size that they may be easily selected by using the touch screen.

A user would focus in the middle of the screen to discern the view map 22 and be able to see which one of the many views 22C is being displayed and be able to touch any other view to bring up that view on the screen. That is, a user is exposed to the entire document and sees a certain specific part of it only based on what would fit the screen size of the particular device, and be able to navigate via the view map 22 to any other part of the document page 22D or to a screen view 22C of that page.

This, it is believed is preferable for the user instead for the need to zoom and scroll the content on the limited size screen of the device and thus it is believed is more efficient way to visually be exposed to and read a document that does not fit the limited screen size of the device.

Display Logic 18

Figure 3:
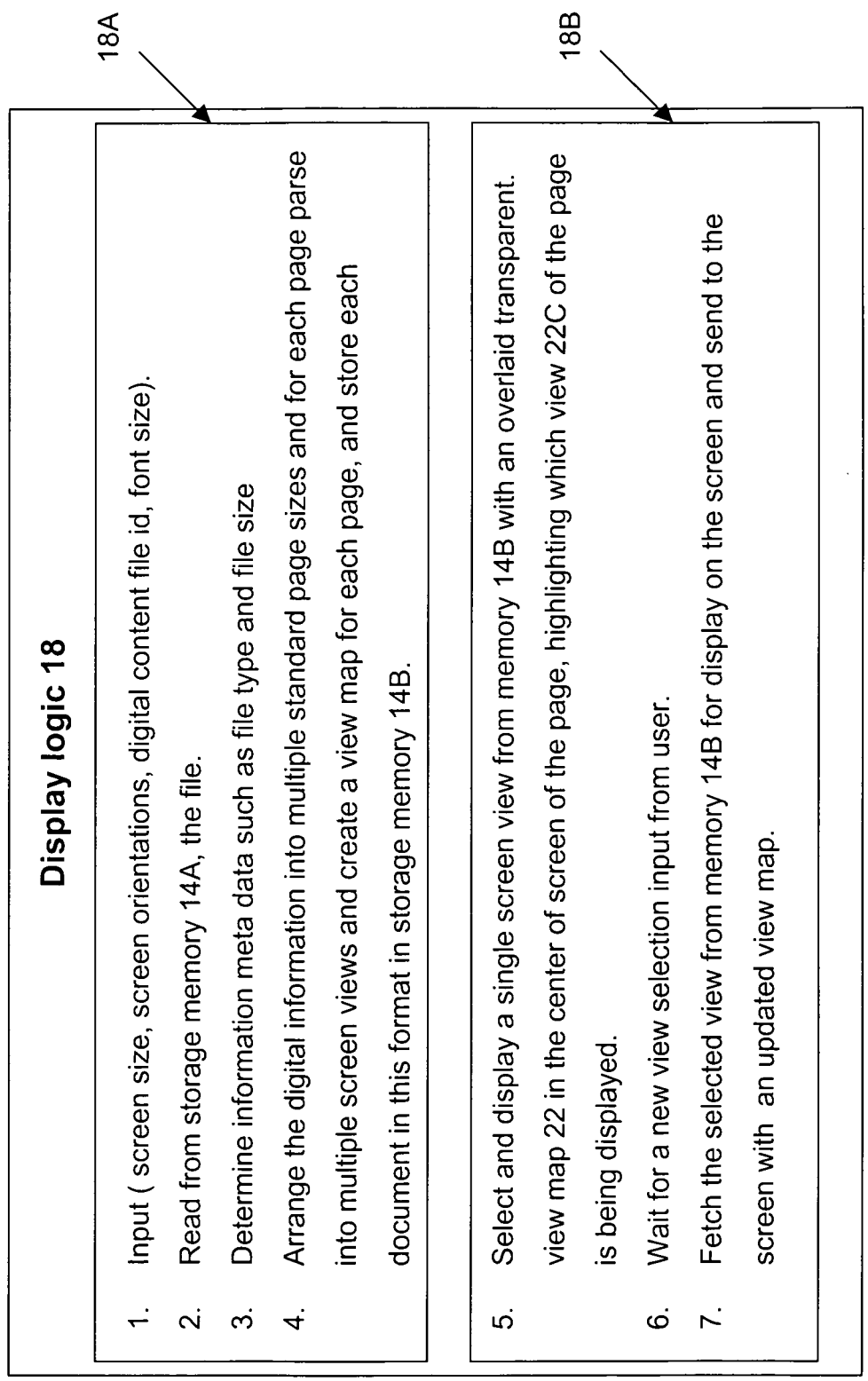
FIG. 3 is a block diagram that illustrates features of the present embodiment of the invention of viewing digital content on a larger screen size.

FIG. 3 shows the various functions of the display logic 18. The functions performed by the display logic 18A are:

1. Input (screen size, screen orientations, digital content file id, font size).
2. Read from storage memory 14A, the document file.
3. Determine meta data information such as, file type and file size.
4. Arrange the digital information into multiple standard page sizes and for each page parse into multiple screen views and create a view map for each page, and store each document in this format in storage memory 14B.

The functions performed by the display logic 18B are:

5. Select and display a single screen view from memory 14B with an overlaid transparent view map 22 in the center of the screen of the page, highlighting which view 22C of the page is being displayed.
6. Wait for a new screen view pr page view selection input from user.

7. Fetch the selected view or the page from memory 14B for display on the screen and send to the screen with an updated view map.

Figure 4A:
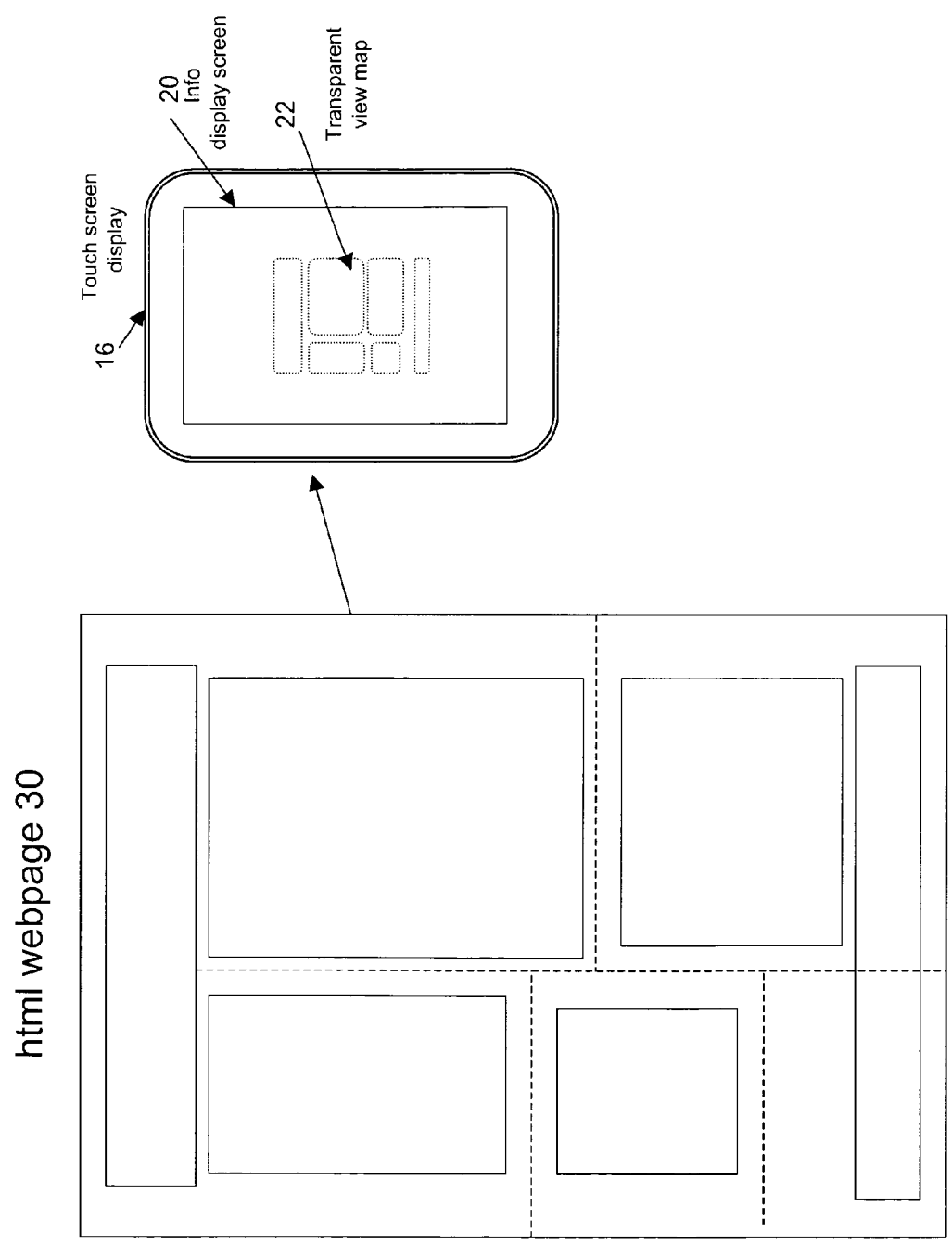
FIG. 4A-D are block diagram of the display screen of the present embodiments of the invention for parsing and viewing digital content larger than the screen size for different formats of the digital content such as html page, text document, e-mail, and text message sequence.
Figure 4B:
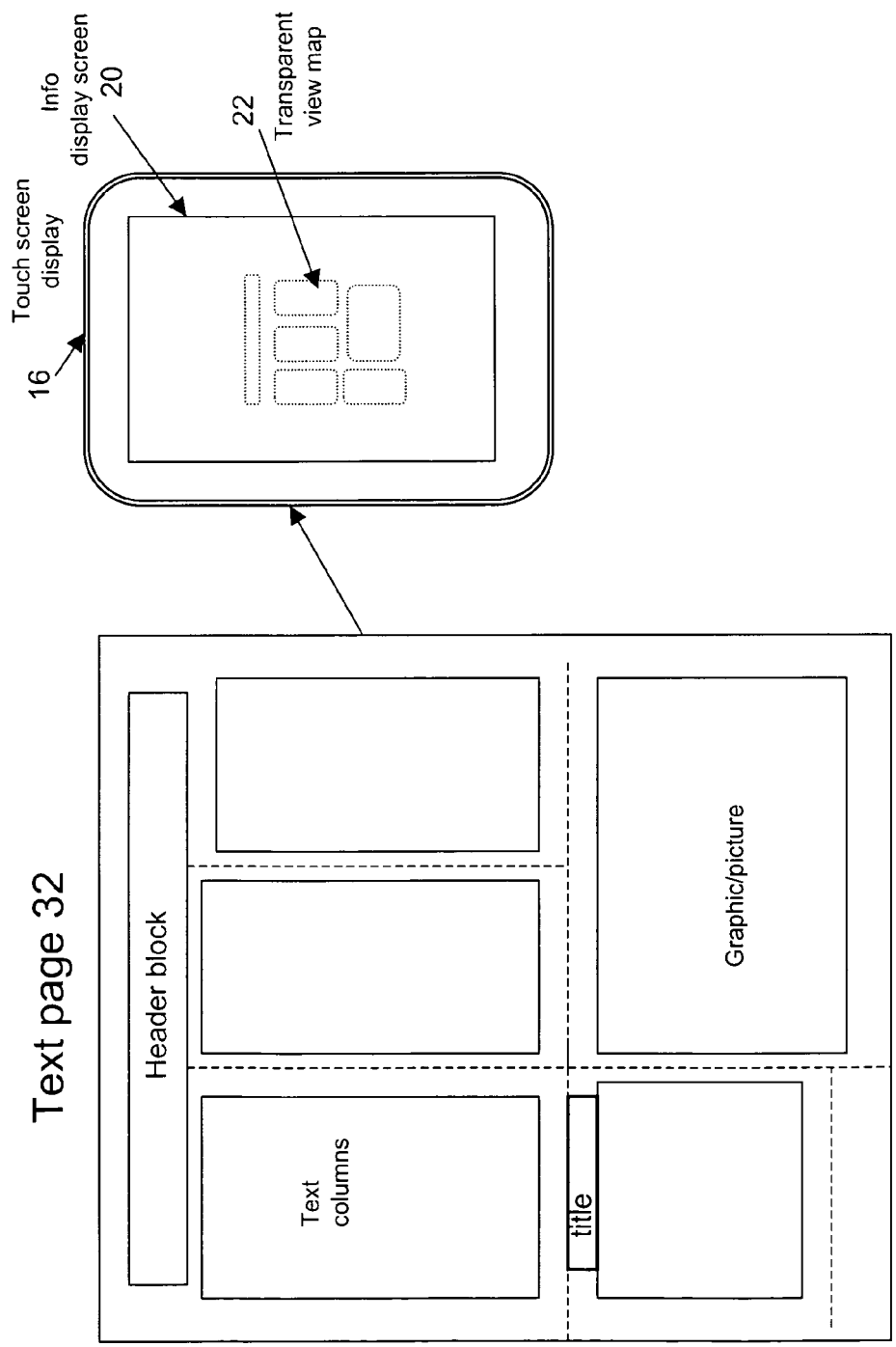
Figure 4C:
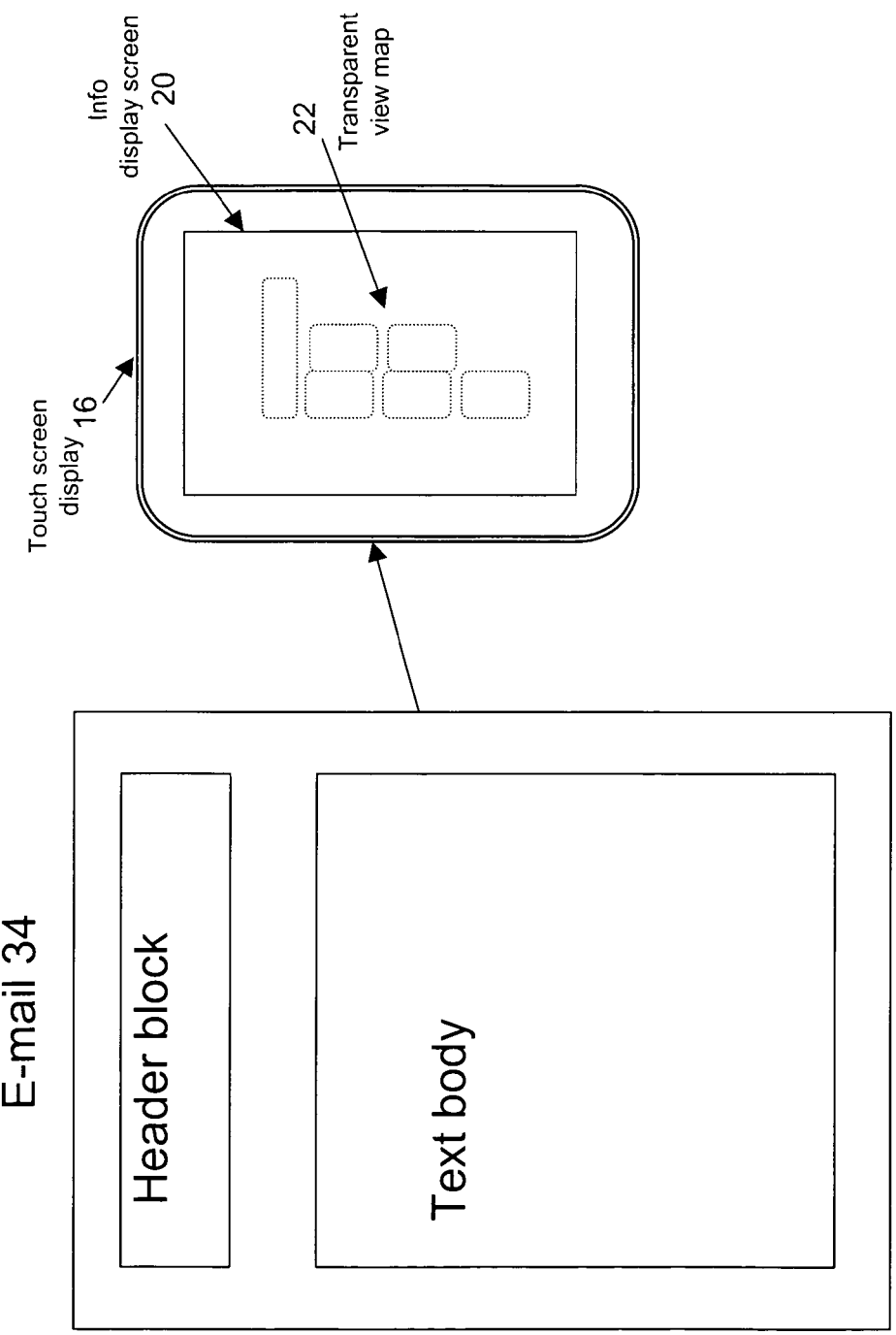
Figure 4D:
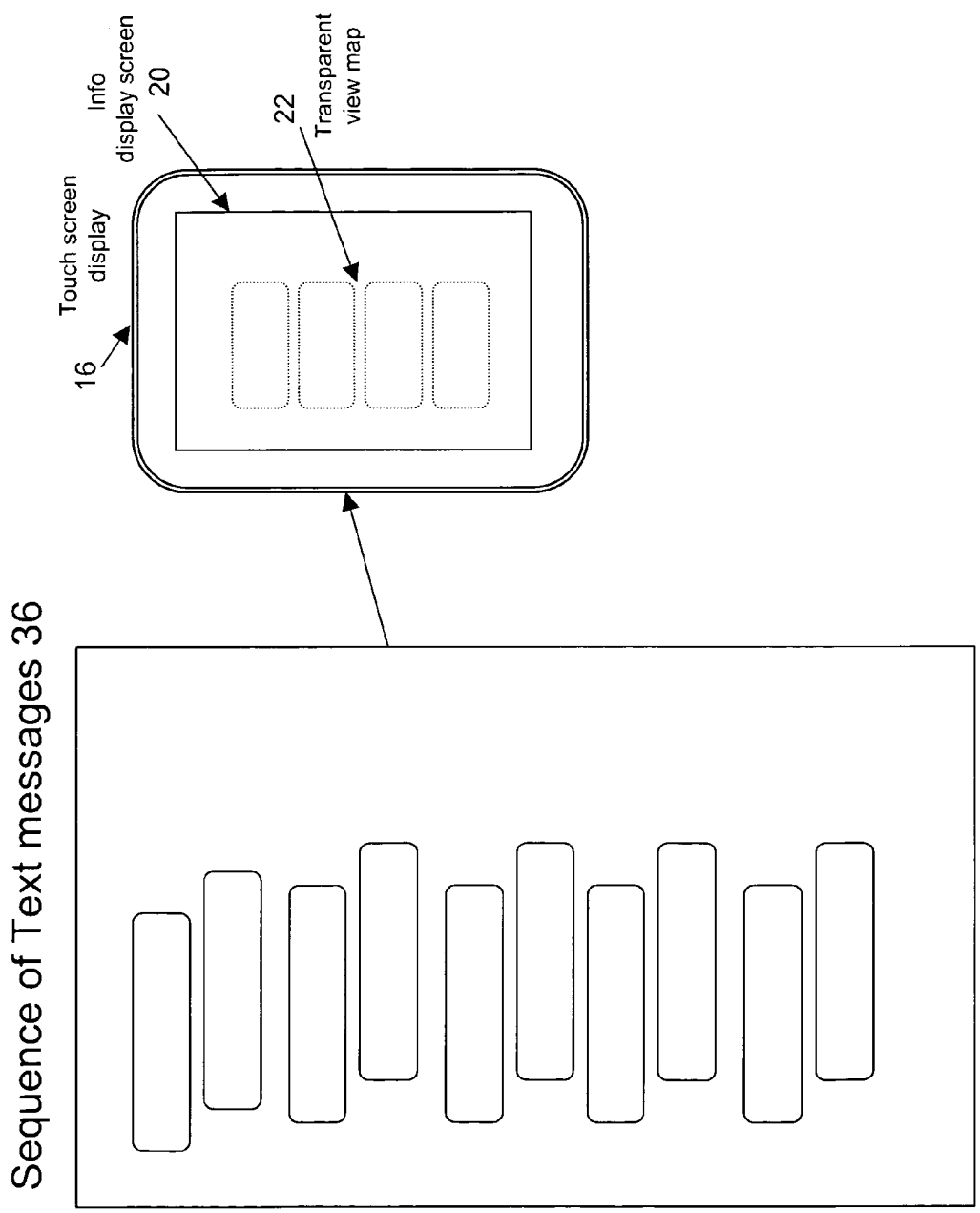

FIGS. 4A-D show simplified illustrations of different document formats and how they may be parsed into screen views for a view map 22. FIG. 4A shows a web page in html format 30 with its layout and a corresponding view map 22. FIG. 4B shows a text page with multiple columns 32 and its corresponding view map 22. FIG. 4C shows an e-mail format 34 and its corresponding view map 22. FIG. 4D shows a sequence of text messages format 36 and its corresponding view map 22. Any other standard format may be similarly parsed into its screen views.

The e-mail format 34 may have attachments in the form of documents of any number of formats. These attachments file names may be shown as a separate screen in the view map or they be shown as part of the header block identifying them as attachments like other fields of, From, To, CC, and Subject in the header block. In either case, the file names are links to other documents. These other documents may have their own view maps as described earlier.

These documents formats are well known and each format provides for control characters in the document that may be used to format such documents for display. These control characters are used by the display logic 18A to parse each page into multiple screen views that are extracted from the page to be relevant to a human viewer to understand and comprehend the digital content on the page.

Figure 5:
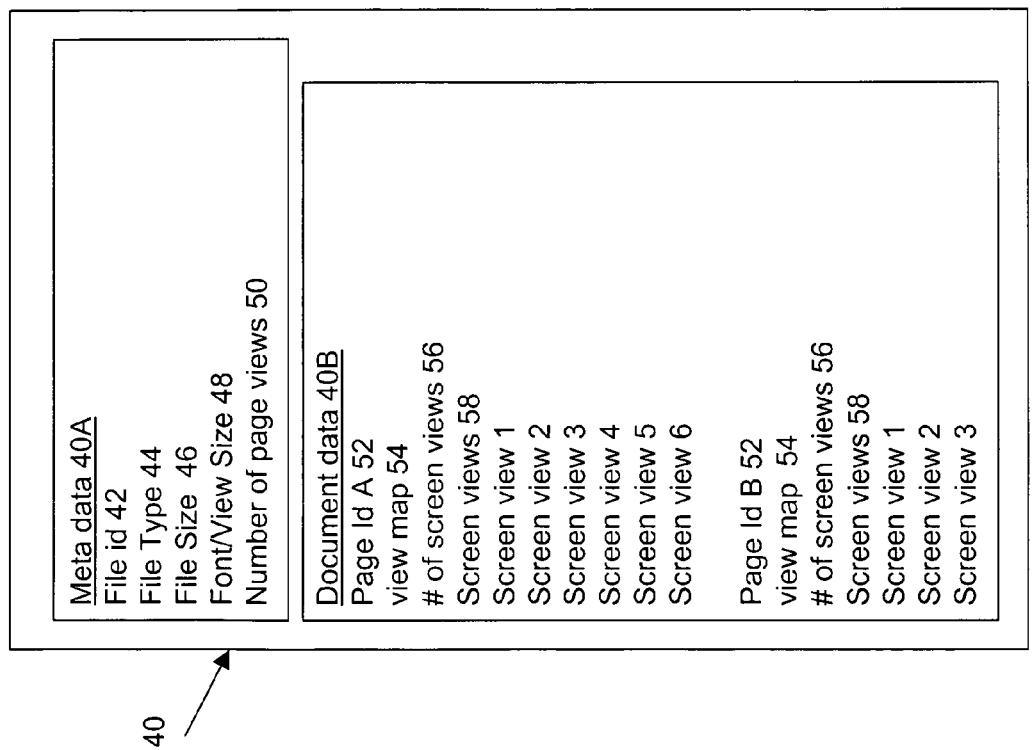
FIG. 5 is a block diagram that illustrates features of the present embodiment of the invention of databases used for display logic.

FIG. 5 shows the structure and format of data fields 40 in the storage memory 14. Meta data is shown as 40A and document data as fields 40B.

As a simplified illustration, Meta data 40A has fields of:
Meta Data 40A
File id A 42
File Type 44
File Size 46
Font/View Size 48
Number of page views 50

As a simplified illustration, Document data 40B has fields of, where the document has two pages:
Document Data 40B
Page Id A 52
A view map 54
Number of screen views 56
Screen views 58
Screen view 1
Screen view 2
Screen view 3
Screen view 4
Screen view 5
Screen view 6
Page Id B 52
A view map 54
Number of screen views 56
Screen views 58
Screen view 1
Screen view 2
Screen view 3

A user may also be able to input a parameter for his preference of the font size/zoom size. For example font size 10 may be standard and a user may prefer a size 12 or a size 8. Some people with the need for close up glasses may prefer a larger font size or a zoom view. The display logic 18 would convert a document's screen views to reflect that user selection of the font or zoom value. Thus a user minimizes the number of operations, such as zoom and scroll and the need to use them repeatedly to read a document that are required to see a document on a limited size screen.

As provided in the prior art, each document has a file extension that determines the type and is used in parsing the document page. Further each type of document as in prior art provides for document formatting markers on the page. These document formatting markers usually are paragraph, line space, titles, headers, columns and picture or graphics, among many others such as table and cells. These document formatting markers may be used to be able to parse the page into multiple screen views that are user friendly and useful to the user to navigate from.

The display logic 18 may be integrated with the operating system 12 as an application program and is executed by the operating system. There are many prior art examples, such as Adobe etc. where applications provided by third party vendors are integrated with the operating system. The display logic may also be a part of the operating system and activated automatically whenever content is selected for display on the screen.

A system 10 for displaying information on a display screen 16 of a computing device, where the digital content is of the size that exceeds the display screen size for display, has a computing device has a CPU, an operating system, a storage memory for receiving and storing digital content, and a display screen 16 for displaying information from the storage memory 14A.

Display logic 18 operable in the CPU, parses the content into multiple screen views, each screen view is sized for the screen and an orientation of the screen, and stores these multiple screen views in the memory 14B.

The display logic 18B selects and displays a single screen view from the multiple screen views on the display screen overlaid with a transparent view map 22 of the multiple screen views with the view map 22 highlighting the specific screen view 22C being displayed.

On touch-selecting a specific screen view from the view map brings up that screen view for display from the storage memory, with an updated view map, enabling a user to simultaneously be exposed to and see a view of the digital content, know the size of the digital content, and select any screen view for display, without having to zoom or scroll the content.

The view map uses closed figures to identify multiple screen views and page views of the digital content and highlights the selected screen view and a page by highlighted lines of the closed figure that are transparent over the digital content display on the screen.

The logic 18A first reads a document from memory 14A and sorts the content into one or more standard format pages and then parses each standard page into multiple screen views based on the screen size. The display logic 18A in the CPU, receives parameters of content size, screen size, font size, an orientation and using them parses the content into multiple screen views, each screen view is sized for the screen and the orientation, and stores these multiple screen views in the memory 14B.

The display logic 18B is programmed to select the first view of the digital content that provides a representation of the content, including from a group of, a title, a first sentence, a first paragraph, a header block or an e-mail, and a first image.

The view map 22 displays also a sequence indicator of multiple pages if more than one standard page is required for display of the content, enabling the user to know the number of pages in the document and the user to access the view map of another page.

The display logic 18 parses each page into multiple screen views based on information arranged in columns and headlines on the page, enabling the user to view information as it was formatted on the page.

As shown in FIG. 6A, a method for displaying information on a display screen of a computing device, where the digital content is of the size that exceeds the display screen size for display, has the following steps, where all the steps may not be used or used in the order specified.

At step 60, receiving and storing digital content in a storage memory of a computing device with a CPU that has a display screen for displaying information from the storage memory.

At step 62, receiving parameters of digital content file id, digital content size, device screen size, font size, and screen orientation by a display logic and parsing the content into multiple screen views, each screen view is sized for the screen and the orientation, and storing these multiple screen views in a part of the storage memory.

At step 64, selecting and displaying a single screen view of the multiple views on the screen by the display logic overlaid with a transparent view map of the screen views with the map highlighting the specific view being displayed.

At step 66, touch selecting a view from the view map for bringing up that specific view for display, with an updated view map, enabling a user to simultaneously be exposed to and see a view of the digital content, know the size of the digital content and select any view for display, without having to zoom in and scroll the content.

At step 68, sorting by the logic, first the digital content into one or more standard format pages from a group of page formats of, an html page, a text page, a PDF image, an image page and then parsing each standard page into multiple views based on the page type and the screen size.

At step 70, programming the display logic to select the first view of the digital content that provides a representation of the content, including from a group of, a title, a first sentence, a first paragraph, a header block, and a first image.

At step 72, displaying a sequence indicator in the view map, for multiple pages, if more than one standard page is required for display of the content, enabling the user to know number of pages and accessing the view map of another page.

At step 74, parsing by the display logic, each page into multiple views based on information arranged in columns and headlines on the page, enabling the user to view information as it was formatted on the page.

As shown in FIG. 6B, for the second embodiment, a method for displaying information on a display screen of a computing device, where the digital content is of the size that exceeds the display screen size for display, has the steps of, where all the steps may not be used or used in the order specified:

At step 80, embedding a device_type parameter in the protocol between the device and a web server for requesting content from the server.

At step 82, formatting content for the device_type in the web server before sending the content to the device.

At step 84, passing the device_type and screen_size parameters as part of http protocol from the device to the web server.

At step 86, alternatively, requesting by the web-server a device_type parameter before sending content to the device formatted for the device.

At step 88, maintaining a table in the web server mapping device_type into the screen size, for use in formatting content before sending content to the device.

In summary, the embodiments herein are on systems and methods that enable a larger than screen size digital content to be displayed on a limited size screen without the need to scroll and or zoom the document. Thus the systems and methods provide a more user friendly and efficient user interface for viewing such documents that may be of the webpage format, a text format, an e-mail format and a text message sequence.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A system for displaying digital content on a display screen of a computing device, the computing device is a handheld mobile wireless communication device with a limited display screen size where the digital content is of a size that exceeds the display screen size for display, comprising:
   a. a computing device with a CPU, an operating system, a storage memory for receiving and storing the digital content, and a display screen for displaying digital content from the storage memory, the computing device is the handheld mobile wireless communication device including a smart phone and a tablet with the limited display screen size;
   b. a display logic operable in the CPU, receives parameters of a digital content size, a display screen size, and display screen orientation and parses the digital content into multiple screen views, each screen view is sized for the display screen size and an orientation of the display screen, and stores these multiple screen views in the storage memory for subsequent display of the screen views to a user;
   c. the display logic creates a transparent view map of icons of multiple screen views and selects a single screen view of the multiple screen views and overlays the transparent view map of icons representing the multiple screen views with the single screen view on the display screen highlighting the icon for the specific screen view being displayed for the user to simultaneously read the single screen view and be exposed to the size of the digital content.

2. The system as in claim 1, comprising:
on touch-selecting a specific screen view icon from the icon view map brings up the touch-selected screen view for display from the storage memory, with an icon view map updated with the highlighted icon, enabling the user to simultaneously be exposed to and see a view of the digital content, know a size of the digital content, and select any screen view for display, without having to zoom or scroll the content.

3. The system as in claim 1, comprising:
the icon view map uses closed figures to identify the icons for the multiple screen views and page views of the digital content and highlights the icon for the selected screen view and a page by highlighted lines of the closed figure of the icon that are transparent over the digital content display on the screen.

4. The system as in claim 1, comprising:
the display logic first sorts the digital content into one or more standard format pages and then parses each standard page into the multiple screen views based on the display screen size.

5. The system as in claim 4, comprising:
the icon view map displays also a sequence indicator of multiple pages if more than one standard page is required for display of the content, enabling the user to know the number of pages in the document and the user to access the icon view map of another page.

6. The system as in claim 1, comprising:
the display logic in the CPU, receives parameters of the digital content size, and the screen size from the device, and receives parameters of a font size, and screen orientations from the user setting, and, using them, parses the content into the multiple screen views, each screen view is sized for the screen and an orientation, and stores these multiple screen views in the storage memory.

7. The system as in claim 1, comprising:
the display logic is programmed to select a first view of the digital content that provides a representation of the content, including from a group of, a title, a first sentence, a first paragraph, and a first image.

8. The system as in claim 1, comprising:
the display logic parses each page of a plurality of pages into the multiple screen views based on information arranged in columns and headlines on the page, enabling the user to view the information as it was formatted on the page.

9. A method for displaying information on a display screen of a computing device, the computing device is a handheld mobile wireless communication device with a limited display screen size where the digital content is of the size that exceeds a display screen size for display, comprising the steps of:
  a. receiving and storing the digital content in a storage memory of a computing device with a CPU, an operating system, and a display screen for displaying information from the storage memory, the computing device is the handheld mobile wireless communication device including a smart phone and a tablet with the limited display screen size;
  b. receiving parameters of digital content size, device screen size, font size, and screen orientation by a display logic in the CPU and parsing the digital content into multiple screen views, each screen view is sized for the display screen size and the screen orientation, and storing these multiple screen views in a part of the storage memory;
  c. creating by the display logic a transparent view map of icons of multiple screen views and selecting a single screen view of the multiple screen views and overlaying the transparent view map of icons representing the multiple screen views with the single screen view on the display screen highlighting the icon for the specific screen view being displayed enabling the user to simultaneously read the single screen view and be exposed to the size of the digital content.

10. The method as in claim 9, comprising the steps of:
touch-selecting the icon for a screen view from the view map for bringing up the touch-selected screen view for display, with an updated icon view map, enabling a user to simultaneously be exposed to and see a view of the digital content, know the size of the digital content and select any screen view for display, without having to zoom or scroll the content.

11. The method as in claim 9, comprising the steps of:
sorting by the logic first the digital content into one or more standard format pages from a group of pages of, an html page, a text page, a PDF image, an image page, and then parsing each standard page into the multiple screen views based on page type and the display screen size.

12. The method as in claim 9, comprising the steps of:
programming the display logic to select a first screen view of the digital content that provides a representation of the content, including from a group of, a title, a first sentence, a first paragraph, and a first image.

13. The method as in claim 11, comprising the steps of:
displaying a sequence indicator in a view map, for multiple pages, if more than one standard page is required for display of the content, enabling a user to know the number of pages in the document and accessing the view map of another page.

14. The method as in claim 11, comprising the steps of:
parsing by the display logic, each page into multiple screen views based on the information arranged in columns and headlines on the page, enabling a user to view the information as it was formatted on the page.

* * * * *